United States Patent
Hew et al.

(10) Patent No.: US 8,346,953 B1
(45) Date of Patent: Jan. 1, 2013

(54) METHODS AND SYSTEMS FOR RESTRICTING ELECTRONIC CONTENT ACCESS BASED ON GUARDIAN CONTROL DECISIONS

(75) Inventors: Chin Hew, Potomac, MD (US); Thu Rein Kyaw, Reston, VA (US)

(73) Assignee: AOL, Inc., Dulles, VA (US)

( * ) Notice: Subject to any disclaimer, the term of this patent is extended or adjusted under 35 U.S.C. 154(b) by 335 days.

(21) Appl. No.: 12/000,843

(22) Filed: Dec. 18, 2007

(51) Int. Cl.
*G06F 15/16* (2006.01)
*H04N 7/16* (2011.01)

(52) U.S. Cl. ........... 709/229; 709/201; 709/206; 725/28

(58) Field of Classification Search .......... 709/227–229, 709/207–209
See application file for complete search history.

(56) References Cited

U.S. PATENT DOCUMENTS

| | | | |
|---|---|---|---|
| 5,101,424 A | 3/1992 | Clayton et al. | |
| 5,619,648 A | 4/1997 | Canale et al. | |
| 5,796,948 A | 8/1998 | Cohen | |
| 5,826,261 A | 10/1998 | Spencer | |
| 5,835,722 A | 11/1998 | Bradshaw et al. | |
| 5,987,446 A | 11/1999 | Corey | |
| 5,987,611 A | 11/1999 | Freund | |
| 5,999,932 A | 12/1999 | Paul | |
| 6,065,056 A | 5/2000 | Bradshaw et al. | |
| 6,076,100 A | 6/2000 | Cottrille | |
| 6,098,066 A | 8/2000 | Snow et al. | |
| 6,101,310 A | 8/2000 | Terada | |
| 6,112,201 A | 8/2000 | Wical | |
| 6,112,227 A | 8/2000 | Heiner | |
| 6,125,353 A | 9/2000 | Yagasaki | |
| 6,128,739 A | 10/2000 | Fleming et al. | |
| 6,145,004 A | 11/2000 | Walsh | |
| 6,167,450 A | 12/2000 | Angwin et al. | |
| 6,275,820 B1 | 8/2001 | Navin-Chandra | |
| 6,278,993 B1 | 8/2001 | Kumar | |
| 6,327,590 B1 | 12/2001 | Chidlovskii | |
| 6,370,527 B1 | 4/2002 | Singhal | |
| 6,393,464 B1 | 5/2002 | Dieterman | |

(Continued)

FOREIGN PATENT DOCUMENTS

EP 0375138 6/1990

(Continued)

OTHER PUBLICATIONS

Business Wire; Jul. 26, 2006; Bethpage, New York.

(Continued)

*Primary Examiner* — Ashok Patel
*Assistant Examiner* — Evans Desrosiers
(74) *Attorney, Agent, or Firm* — Finnegan, Henderson, Farabow, Garrett & Dunner LLP

(57) ABSTRACT

Methods, computer-readable media, and systems are provided to facilitate a second user to allow or deny a first user, such as a child, from accessing content by proving the second user with a content profile based on decisions made by other users with respect to the content. In one implementation, a system allows the second user to set a threshold to automatically allow or deny access based on the other users' decisions. The decisions made by other users are aggregated into information that may be based on similarities between the child and other children from whom other users have previously made decisions regarding the particular content. In addition, the aggregation may more heavily weight decisions by users that have a history of making similar decisions to the second user.

20 Claims, 8 Drawing Sheets

U.S. PATENT DOCUMENTS

| | | |
|---|---|---|
| 6,442,549 B1 | 8/2002 | Schneider |
| 6,456,998 B1 | 9/2002 | Bui |
| 6,519,639 B1 | 2/2003 | Glasser et al. |
| 6,560,600 B1 | 5/2003 | Broder |
| 6,564,787 B1 | 5/2003 | Aronson et al. |
| 6,571,256 B1 | 5/2003 | Dorian et al. |
| 6,574,632 B2 | 6/2003 | Fox |
| 6,601,061 B1 | 7/2003 | Holt |
| 6,615,248 B1 | 9/2003 | Smith |
| 6,631,244 B2 | 10/2003 | Suginaga |
| 6,704,729 B1 | 3/2004 | Klein |
| 6,732,157 B1 | 5/2004 | Gordon et al. |
| 6,745,227 B1 | 6/2004 | Bates |
| 6,785,671 B1 | 8/2004 | Bailey |
| 6,785,824 B1 | 8/2004 | Grassle |
| 6,854,074 B2 | 2/2005 | McLellan et al. |
| 6,859,807 B1 | 2/2005 | Knight |
| 6,938,021 B2 | 8/2005 | Shear |
| 7,046,139 B2 | 5/2006 | Kuhn et al. |
| 7,051,116 B1 | 5/2006 | Rodriguez |
| 2001/0003828 A1 | 6/2001 | Peterson et al. |
| 2002/0049806 A1 | 4/2002 | Gatz et al. |
| 2002/0049907 A1 | 4/2002 | Woods et al. |
| 2002/0120866 A1 | 8/2002 | Mitchell et al. |
| 2002/0165777 A1 | 11/2002 | Lotvin et al. |
| 2002/0181703 A1 | 12/2002 | Logan et al. |
| 2002/0184496 A1 | 12/2002 | Mitchell et al. |
| 2003/0023736 A1 | 1/2003 | Abkemeier |
| 2003/0061111 A1 | 3/2003 | Dutta et al. |
| 2003/0177111 A1 | 9/2003 | Egendorf |
| 2003/0204741 A1 | 10/2003 | Schoen et al. |
| 2004/0003071 A1 | 1/2004 | Mathew et al. |
| 2004/0006621 A1 | 1/2004 | Bellinson et al. |
| 2004/0019650 A1 | 1/2004 | Auvenshine |
| 2004/0093384 A1 | 5/2004 | Shipp |
| 2004/0154022 A1 | 8/2004 | Boss et al. |
| 2004/0177015 A1 | 9/2004 | Galai |
| 2004/0181690 A1 | 9/2004 | Rothermel et al. |
| 2005/0021637 A1* | 1/2005 | Cox .............................. 709/206 |
| 2005/0044181 A1 | 2/2005 | Lee |
| 2005/0050222 A1 | 3/2005 | Packer |
| 2005/0055416 A1 | 3/2005 | Heikes et al. |
| 2005/0091385 A1 | 4/2005 | Nordstrom |
| 2005/0102407 A1 | 5/2005 | Clapper |
| 2005/0144297 A1 | 6/2005 | Dahlstrom et al. |
| 2005/0149622 A1 | 7/2005 | Kirkland et al. |
| 2005/0160144 A1 | 7/2005 | Bhatia |
| 2006/0127870 A1 | 6/2006 | Fields et al. |
| 2006/0161668 A1 | 7/2006 | Mathew et al. |
| 2006/0161669 A1 | 7/2006 | Mathew et al. |
| 2006/0168186 A1 | 7/2006 | Mathew et al. |
| 2006/0173792 A1 | 8/2006 | Glass |
| 2006/0173793 A1 | 8/2006 | Glass |
| 2006/0263757 A1 | 11/2006 | Bender |
| 2007/0061869 A1 | 3/2007 | DeHaas |
| 2007/0245367 A1* | 10/2007 | Ogawa ............................ 725/28 |
| 2008/0147772 A1* | 6/2008 | Runne ............................ 709/201 |
| 2008/0148310 A1* | 6/2008 | Strickland ........................ 725/30 |

FOREIGN PATENT DOCUMENTS

| | | |
|---|---|---|
| EP | 827 063 A | 3/1999 |
| EP | 918 295 A | 5/1999 |
| EP | 945 811 A | 9/1999 |
| EP | 1 045 547 A | 10/2000 |
| EP | 1079318 | 2/2001 |
| EP | 1 209 866 | 5/2002 |
| JP | 2000 357176 | 12/2000 |
| WO | WO 99/39286 | 8/1999 |
| WO | WO 00/26762 | 5/2000 |
| WO | WO 00/58894 | 10/2000 |
| WO | WO 00/68815 | 11/2000 |
| WO | WO 01/16806 | 3/2001 |
| WO | WO 01/27720 | 4/2001 |

OTHER PUBLICATIONS

Sentry Remote; "Sentry Remote," at; http://web.archive.org/web/20070629024905/www.sentryparentalcontrols.com/Content/Products/Remote.aspx; Jun. 2007.

Jim Hu, "AOL developing search engine," CNET.com-News—Entertainment & Media—AOL developing search engine, pp. 1-3 [online], (Jun. 21, 1999) [Retrieved on Jul. 26, 2000]. Retrieved from the Internet: http://news.cnet.com/news/0-1005-200-343860.html.

Ian Leicht, "Re: My spamblock; Was: Thwarting UCE address culling programs" [online]. Jan. 26, 1997. Retrieved from Internet newsgroup: news.admin.net-abuse.email [retrieved on Jul. 15, 2003], pp. 1-2.

"Development and Operation of the Next-Generation Rating/Filtering System on the Internet," (XP002219058). Retrieved from the Internet: http://www.nmda.or.ip/enc/rating2nd-en.html on Oct. 30, 2002.

T. Negrino, "The MacWorld Web Searcher's Companion," MacWorld, PC World Communications, San Francisco, CA, US, vol. 17, No. 5, May 2000, pp. 76-82 (XP008019722).

Related U.S. Appl. No. 10/774,369.
Related U.S. Appl. No. 09/801,932.
Related U.S. Appl. No. 11/091,272.
Related U.S. Appl. No. 11/555,431.

"Guardian Setup Instructions" [online], American Online [retrieved Nov. 23, 2004]; retrieved from the Internet: http://challenevents.aol.com/guardian/images/print-instructions:gif.

"Guardian an e-mail report that shows parents what their children are doing online" [online], American Online [retrieved on Nov. 23, 2004]; retrieved from the Internet: http://challenevents.aol.com/guardian/.

"Parental Controls" [online], America Online [retrieved on Nov. 23, 2004; retrieved from the Internet: http://www.aol.com./info/parentcontrol.html.

The Wall Street Journal article "Esniff Ferrets Out Misbehavior by 'Reading' E-Mail, Web Visits," Katherine Lange, interactive. wsj.com, Apr. 27, 2001:Tech Q&A.

The Early Report—The Early Show segment, "Big Brother in the Corner Office," Julie Chen, cbsnews.com/earlyshow/caught/techage/20001228e_sniff.shtml, Dec. 28, 2000:Tech Age.

"The eSniff Product Overview," eSniff: Define Your e-Boundaries, www.esniff.com/productoverview.html, May 15, 2001.

Ignite Software: Parent Tools Feature Set, "Parent Tools Features," http://www.parent-tools.com/features.html Ignite Software, pp. 1-3, as accessed on Dec. 10, 2003.

Parent Tools-The Ultimate in Monitoring and Controlling AIMe, "Parent Tools for AIM," http://www.parent-tools.com/screenshots.htm, pp. 1-4, as accessed on Dec. 20, 2003.

McMurray, Sandy, "Shield your children from unsuitable Internet content," http://www.microsoft.com/canada/home/internet&security/2.4.8_protectwithparentalcontrolshowtosafeguardyourcomputer.asp#, Microsoft Home Magazine, pp. 1-3, as accessed on Dec. 10, 2003.

"Instant Messaging is Everyone's Business," Yahoo Business Messenger, Yahoo! 2003.

"SurfControl Instant Message Filter," Instant Message Filter, SurfControl plc. 2003.

"Spammers Target Instant Message Users," http://www.bizreport.com/article.php?art_id=5507 Nov. 13, 2003, pp. 1-4.

Olsen, Stefanie, "Will instant messaging become instant spamming?," http://news.com/2100-1023-252765.html?legacy=cnet, Feb. 16, 2001, pp. 1-4.

"Protect Your Privacy," MSN Features, http://messenger.msn.com/Feature/Pricacy.aspx as accessed on Dec. 2, 2003.

"Jabber" http://www.jabber.com/index.cgi?CONTENT_ID=9, as accessed on Dec. 2, 2003.

"Knock Settings—Servers Tab," http://www.knockmail.com/support/adverserverset.html, pp. 1-2, as accessed on Dec. 4, 2003.

"Preview Pending Emails in KnockMail," http://www.knockmail.com/support/previewemail.html, pp. 1-2, as accessed on Dec. 4, 2003.

"Managing your Addresses in KnockMail," http://www.knockmail.com/support/manaddresses.html, pp. 1-2, as accessed on Dec. 4, 2003.

"Approved Database," http://www.knockmail.com/support/appdatabase.html, p. 1, as accessed on Dec. 4, 2003.

"Pending Database for KnockKnock," http://www.knockmail.com/support/penddatabase.html, p. 1, as accessed on Dec. 4, 2003.

"Denied Database for KnockKnock," http://www.knockmail.com/support/denydatabase.html, pp. 1, as accessed on Dec. 4, 2003.

"Email Server Control for KnockKnock," http://www.knockmail.com/support/emailservcont.html, p. 1-2, as accessed on Dec. 4, 2003.

"Listserv Control for KnockKnock," http://www.knockmail.com/support/listservcont.html, p. 1, as accessed on Dec. 4, 2003.

http://www.knockmail.com/support/newsettings.jpg, as accessed on Dec. 4, 2003.

SpectorSoft Corporation, Industry Leading Spy Software Company Announces Instant Messaging Feature in Spector Professional Edition, Apr. 24, 2002.

SpectorSoft Corporation, SpectorSoft Corporation Ships Major Upgrade of eBlaster, Aug. 21, 2002.

Press release, SpectorSoft Corporation, SpectorSoft Announces New Version of Award Winning Spector Software, May 18, 2000.

Miller, Nigel, "Can an employer monitor its employees' E-mail?," Computer Audit Update, May 1997, pp. 30-31.

* cited by examiner

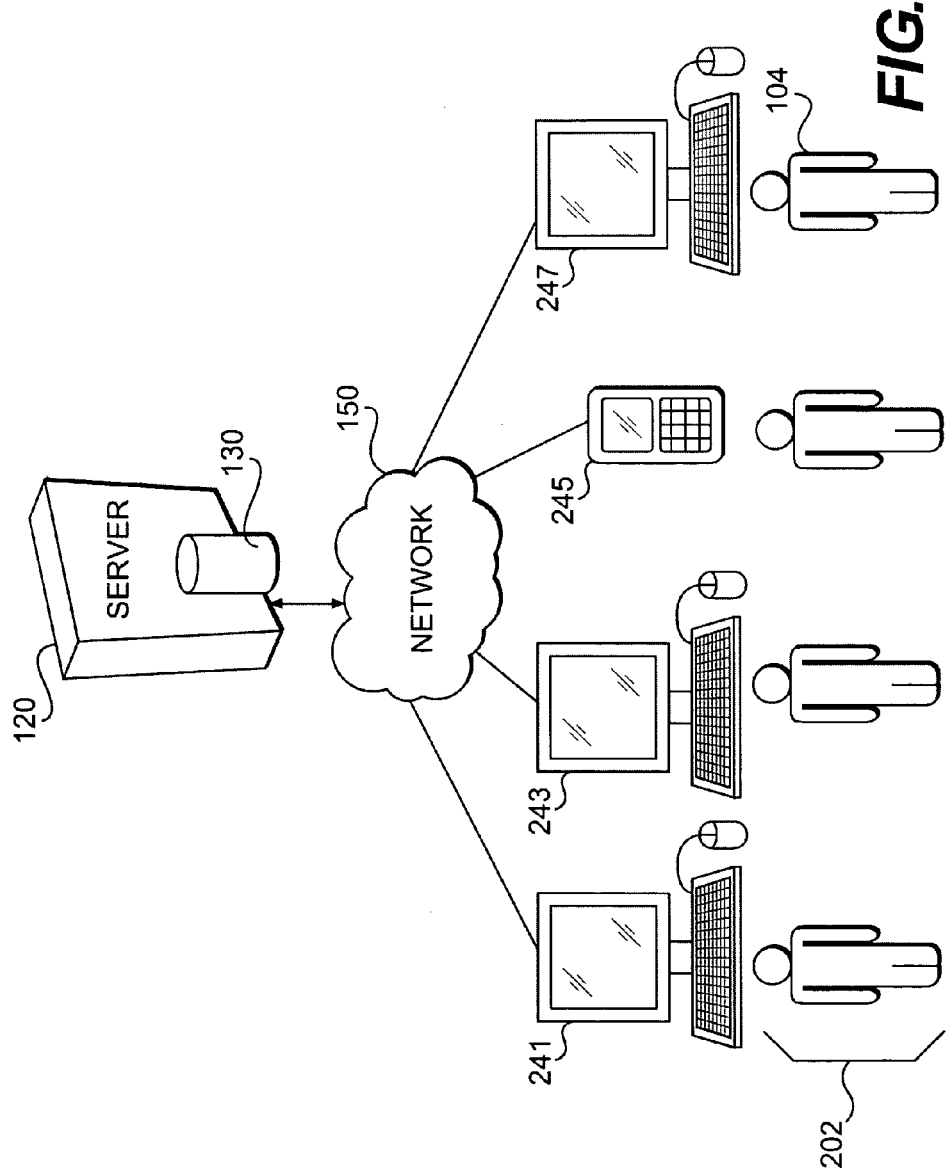

METHODS AND SYSTEMS FOR RESTRICTING ELECTRONIC CONTENT ACCESS BASED ON GUARDIAN CONTROL DECISIONS

TECHNICAL FIELD

The present disclosure generally relates to the field of electronic content monitoring and to methods and systems for restricting access to content based on guardian control decisions. More specifically, the disclosure relates to methods and systems for allowing a guardian, either personally or via a preset threshold value, to allow or deny a user, such as a child, from accessing content by proving the guardian with a content profile that is based on past decisions made by other guardians with respect to the content.

BACKGROUND

Web sites accessible via the Internet contain all sorts of electronic content, some of which is not be desirable for children. To prevent children from accessing undesirable Web content, some browsers enable the filtering of undesirable Internet content by enabling children to only browse from a selected list of Web sites. In addition to websites, electronic content can also include particular applications, such as chatting applications, email, music, games, and other tools.

In some monitoring services, a database is provided that is maintained by a service provider subscribed to by a guardian, such as a parent. The database may be stored on a personal computer of the parent that used by the parent's child to access Web content. The service provider keeps track of acceptable Web sites for children. To restrict access to undesirable content, Web sites inappropriate for children are excluded from the database, which is periodically updated by the service provider.

While such approaches exist, these systems do not allow a guardian, such as a parent or teacher, to easily assess whether too much or too little content is being restricted from access. Different parents or other guardians may have different ideas of what content is acceptable for a child. In addition, electronic content is constantly evolving, outpacing the ability for current systems to adequately block or rate new content. Moreover, software companies are incapable of deciding what is right for every type of child or minor. Many factors determine what a guardian may deem appropriate, and current systems cannot effectively tailor access permissions based on guardian and child characteristics.

In view of the foregoing, there is a need for improved methods and systems for restricting access to content, such as Web and other electronic content, There is also a need for improved methods and systems for restricting electronic content access based on guardian control decisions.

SUMMARY

In accordance with an embodiment, a first guardian can remotely control a child's access to electronic content. For example, when the child attempts to access content that the child is not already allowed access, a server receives a request for a content profile. The server, which can include components communicatively connected to the server, creates a content profile by aggregating decisions made by other guardians (e.g., denying or allowing access, rating the content, or both) with respect to the same or similar content. In addition, the aggregation process may take into account similarities between the child and other children when deciding which control decision records to use and/or how much weight to assign to each individual control decision record.

In one embodiment, the aggregation process excludes and/or weights control decision records based on similarities of past decisions by the guardian and the other guardians associated with the control decisions. In this manner, control decision records of like-minded guardians for similar children are given more weight in creating the content profile.

The server may send a first communication containing the content profile to the guardian (either directly or by relaying via the child). Thereafter, the guardian decides whether to allow the child to access the electronic content based on the content profile and/or by previewing or viewing the content. In one embodiment, the guardian can request a second content profile based on selectable criteria. When the guardian submits a decision, the server receives the guardian decision and creates a new control decision record associated with the content identifier. The content identifier may be web address or a unique signature associated with a particular file or application.

In another embodiment, the server may later receive the guardian decision as part of a bulk data transfer from the guardian at some later time, to decrease the amount of traffic across the server. The new control decision record is then stored in the database for use in aiding future decisions by guardians on whether to allow access to content associated with that content identifier. In one embodiment, the guardian sends a communication directly to the child, allowing or denying access. In another embodiment, the access communication is sent from the server to the child.

In another embodiment, a system is employed to automatically determine whether or not access to the electronic content should be allowed. For example, the server receives an access request associated with a content identifier and determines a rating for the content identifier by aggregating past control decision records associated with the content identifier. The aggregation may include at least one control decision record supplied by a guardian other than the child's guardian. A communication based on the rating is then sent to an electronic device used by the child. In one embodiment, the rating is utilized client-side by the electronic device for determining whether access to the content is allowed. In another embodiment, the server compares the rating against a threshold to determine whether access is allowed, and automatically sends a communication to the child's electronic device that is based on this comparison.

The server may determine the threshold based on threshold values used for children that have similar characteristics or attributes to the child. In another embodiment, the threshold is determined based on criteria that is received from the first guardian. In yet another embodiment, the threshold is selected by comparing the threshold values of a plurality of guardians that have made past control decisions similar to the decisions made by the guardian.

In another embodiment, the server collects guardian decisions independently from the process of the child requesting access to content and the first guardian allowing or denying the access. For example, a separate process on the device used by the guardian or child may upload the decision data to the server at some other time. For example, the server can receive a guardian decision from a first guardian and store a new control decision record containing the guardian decision in a database. The control decision record is stored such that it can be accessed based on a content identifier, making the record usable in the aggregation process.

The information stored in the database(s) can also include at least one child attribute associated with the child identifier, such as age, gender, nationality, religion, educational grouping, or locality. A process can run on the server that then assigns a threshold level to the first child identifier based, at least partially, on the threshold levels for children that share the child attribute. Additionally, the threshold level can be calculated based on decisions made by the guardian relative to decisions on similar content made by other guardians, and the threshold values for those guardians. Therefore, if the child's guardian tends to be more lenient in their control decisions than other guardians, the child's threshold will tend to be less strict than for those guardians.

Additional objects and advantages will be set forth in part in the description which follows, and in part will be obvious from the description, or may be learned by practice of the embodiments. The objects and advantages will be realized and attained by means of the elements and combinations particularly pointed out in the appended claims.

It is to be understood that both the foregoing general description and the following detailed description are exemplary and explanatory only and are not restrictive of the embodiments, as claimed.

BRIEF DESCRIPTION OF THE DRAWINGS

The accompanying drawings, which are incorporated in and constitute a part of this specification, illustrate several embodiments and together with the description, serve to explain the principles of the embodiments.

FIG. 2 is a diagram of an exemplary system for retrieving guardian control decisions from guardian devices, in accordance with an embodiment.

DESCRIPTION OF THE EMBODIMENTS

Reference will now be made in detail to the present exemplary embodiments, examples of which are illustrated in the accompanying drawings. Wherever possible, the same reference numbers will be used throughout the drawings to refer to the same or like parts.

Embodiments of the invention may be implemented to allow a first user (such as a child, sibling, student, or employee) to request access to electronic content, and a second user (e.g., a guardian), to allow or deny the request based on decisions made by other guardians. A guardian, as referred to herein, is any person who controls the content access of the first user, such as a parent, teacher, or employer. A guardian decision, as referred to herein, can be a yes or no decision or can contain a guardian's rating of the content. The electronic content can include a web site or an application, such as a chat program, email, music, game, or some other tool.

In one implementation, the guardian is presented with aggregated information that distills numerous past decisions made by other guardians with respect to for the particular content into a statistic or presentation that the guardian can more easily assess. The guardian then typically makes a selection to allow or deny access to the content. In another aspect, the guardian may have preset a threshold to automatically accept or deny access to the content based on a comparison between the aggregated information and the threshold. The threshold may be useful, for example, when the second user (e.g., guardian) is not available to answer the first user's request or does not want to be disturbed.

Figure 1A:
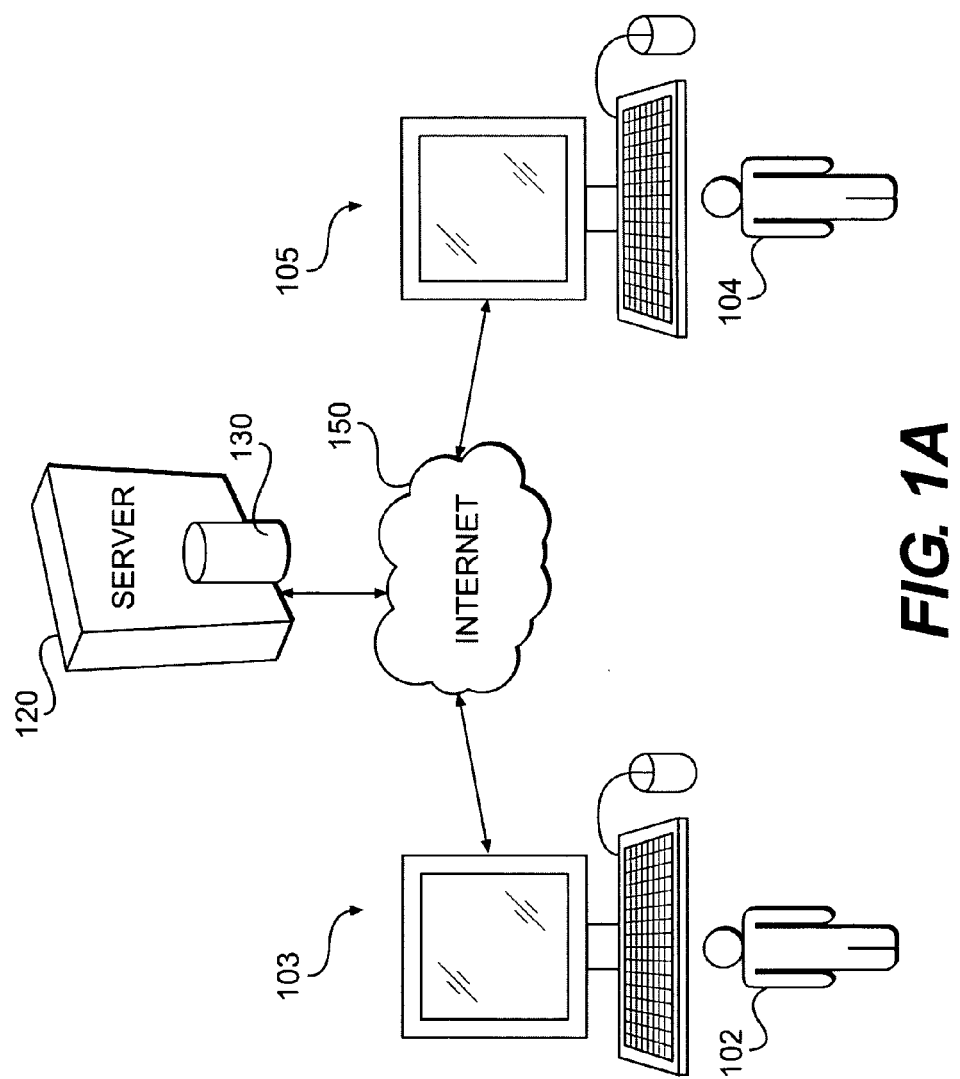
FIGS. 1A and 1B are diagrams of exemplary systems and system components for restricting content access based on guardian control decisions, in accordance with some embodiments.
Figure 1B:
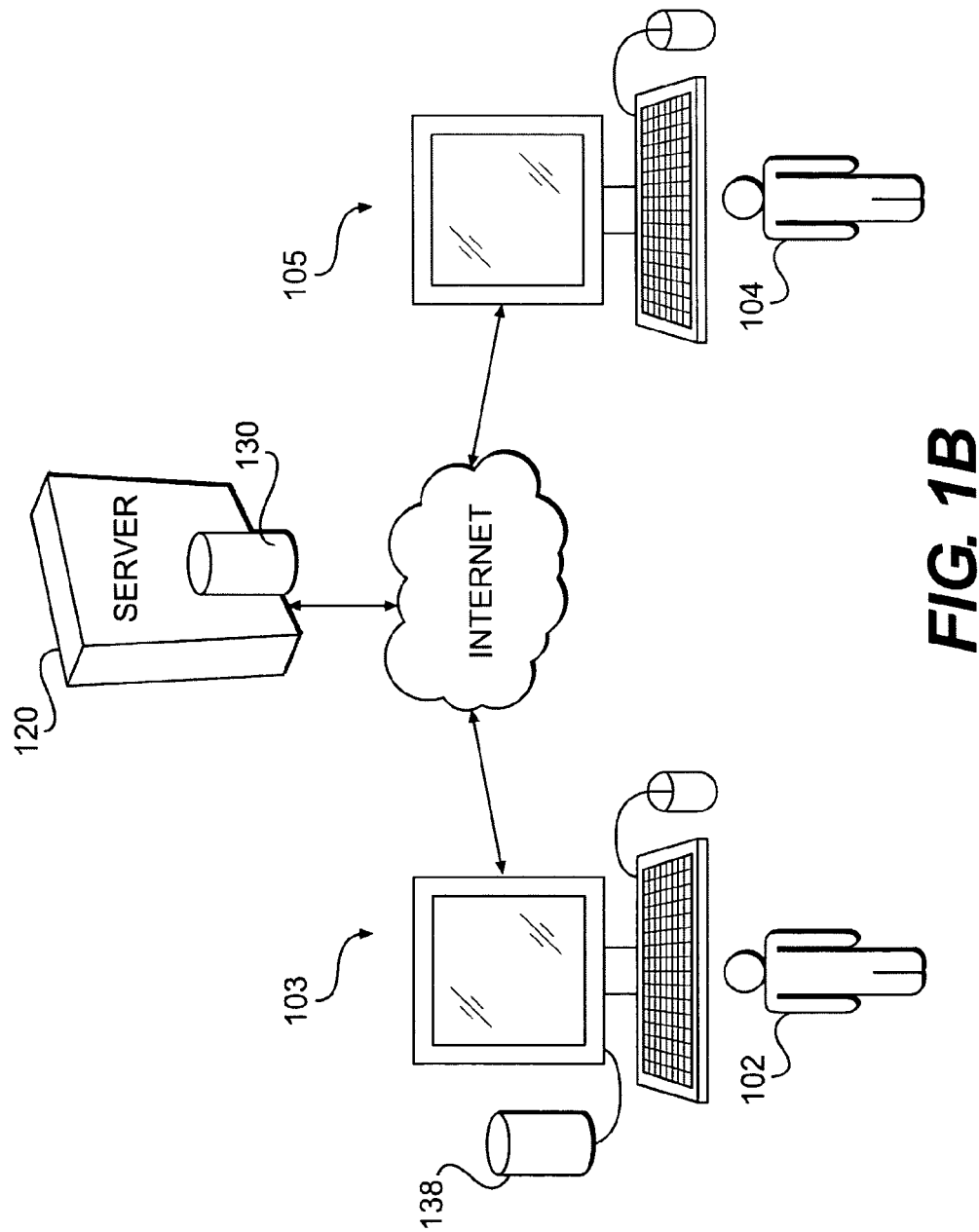

FIGS. 1A and 1B are diagrams of exemplary systems and system components for restricting content access based on guardian control decisions, in accordance with some embodiments. Turning to FIG. 1A, a first device 103 is operated by a first user 102. The first device 103 may be an electronic device with access to the Internet 150. Through the Internet 150 and/or other wired or wireless networks, first device 103 may communicate with a second device 105 operated by a second user 104 and/or a server 120 with database 130.

Both the first device 103 and second device 105 can be any electronic device capable of accessing electronic content, such as a personal computer, laptop, cell phone, PDA, personal media player, or similar device. Generally, the devices 103 and 105 may include a processor capable of executing instructions stored on a computer-readable storage medium, such as a disk, CD, DVD, RAM, flash memory, or any other known memory or electronic storage medium. The first device 103 is operated by a first user 102, such as a child, student, employee, or any other person subject to control decisions by a second user 104. Content monitoring software, such as parental control software, is installed on the first electronic device 103 that restricts the first user 102 from accessing certain content using the first electronic device 103. The restricted content may be content from a particular Web site or URL, or may comprise a file for download via the Internet 150. Web servers and other sources for providing such content are not illustrated in FIGS. 1A and 1B.

In one embodiment, the first device 103 stores records locally that determines what content can and/or cannot be accessed. One implementation allows the first device 103 to maintain a local database, such as database 138 in FIG. 1B. The first device 103 can check the local database 138 to see if the first user 102 is allowed or denied access to particular content, and if a local decision can be reached, further communications with the server 120 and/or second device 105 may not be necessary. For example, the second user 105 (e.g., guardian), such as a parent or employer, may have already conclusively allowed or denied access to the content.

If the first device cannot locally determine whether access to the content should be granted (or, in one implementation, even if a local determination is made), the first device 103 then sends a request to access the content. In one embodiment, the request destination is the second device 105, where the second user 105 (e.g., guardian) determines whether access should be allowed. Alternatively, or additionally, the request may first be sent to server 120, in one implementation. The request can be in the form of an e-mail, instant message ("IM"), text message, or any other electronic message. The first device 103 may first check that the second user 104 is available, such as by checking the second user's 104 online status, before sending the request. In addition to checking whether the second user is online or not, the online status may take into account various statuses that are associated with instant messaging programs, such as whether the second user 104 is "busy" or "away." Some embodiments may not check the second user's availability before sending the request, and instead allow server 120 to determine whether a message should be sent to the second user 104.

Server 120 can include one or more servers and/or other communicatively-coupled components. In one implementation, server 120 is in communication with database 130, which can be comprised of one or more databases and subsystems, and also contains a processor capable of executing instructions stored on a computer-readable storage medium. Server 120 can be automatically accessed by the first device 103 through the Internet 150, via the parental control software.

Server 120 receives an access request from either the first device 103 or the second device 105. In one embodiment, the server 120 is only contacted if the second user 104 needs help in deciding whether to allow access to the content. For example, an e-mail or instant message sent from the first user 102 to the second user 104 may contain a link to the content, and the second user 104 may have time to preview the content themselves. The message may include the option to display a content profile, which, when selected, would then be constructed based on information retrieved from the server 120. In another embodiment, an access request from the first user 102 is sent to server 120 before being delivered to the second user 104, so that the communication received by the second user 104 will already include a content profile.

When the server 120 receives the access request, this request is interpreted as a request for a content profile. The request includes information that allows the server 120 to determine a content identifier associated with the content that the first user 102 wishes to access. Additionally, the request includes information that allows the server 120 to identify the first user 102. In one embodiment, the information includes the content identifier and a child identifier. In another embodiment, the information may include an account number that can be relationally linked to a child identifier in database 130. Similarly, the content identifier may be determined by extracting a portion of a URL and locating the content identifier in the database 130 that is related to the URL. In one aspect, the URL itself is the content identifier. In another embodiment, the content identifier is an unique signature associated with a particular program. For example, access to a chat program may be controlled by checking the unique signature (i.e., content identifier) of the program in the manners discussed herein. Video games, music, and other electronic content may also have unique signatures (i.e., content identifiers).

After the request has been received, the server 120 creates a content profile based on control decision records stored in database 130. A control decision record can be stored in numerous forms, such as in a flat file, relational tables of various schemas and configurations, or an object-oriented database. One configuration is discussed in more detail with reference to the example of FIG. 5, below. Each control decision record may contain a past guardian decision for particular content, which may be identified by the content identifier. In one embodiment, each control decision record is associated with a child identifier, which allows the system to distinguish the decision based on the type of child for which the decision was made. The record can be associated with the child, for example, by two fields within the same table or object, or two fields in separate tables or objects that can be relationally linked to one another.

The content profile can include information from at least one control decision record created by a guardian other than the second user 104. The profile can be created in one implementation by aggregating the control decision records to present the second user 104 with information covering choices made by a wide range of guardians with respect to the particular subject matter. For example, the aggregation may show that 74% of guardians overall allowed access to the subject matter.

In one embodiment, the system also tracks which guardians have changed their decision regarding whether access to particular electronic content should be allowed. Because web sites, applications, and games are constantly evolving, tracking which guardians change their control decisions may allow a guardian or user to determine whether changes in the content should effect their control decision. For example, a second aggregation may show that 24% of guardians overall allowed access to the subject matter after previously denying access. A third aggregation may show that 4% of guardians overall denied access to the subject matter after previously allowing access. In this way, the sequence of control decisions made by other guardians can help a guardian decide whether to allow access to content.

In addition, more particular criteria can be used in aggregating the records for the control decision profile so that the control decision profile more closely mirrors the specific traits of the first user 102. For example, the server may only use control decision records for children that are of similar age as the first user 102. Many other attributes can also be used to limit the scope of the aggregation, such as the first user's gender, nationality, religion, educational grouping, or locality. In particular, the educational grouping can be used to restrict the query to only other children from the first user's 102 grade level, school, and/or class. The guardian may therefore be presented with a message indicating that, for example, 68% of parents allowed their 8-year-old boy, living in Tallahassee, Fla., to access the content.

In another aspect, control decision records for users that share common traits with the first user 102 may be more highly weighted than control decision records with less (or no) traits in common. For example, control decision record for a user of the same grade level, gender, and locality may be given more weight than a control decision for a user that is two years older and at a different grade level, but of the same gender (even though neither record is totally excluded from aggregation). Weighting can be accomplished in one aspect by using a multiplier. For example, software running on the server 120 (including database 130), first device 103, or second device 105 may count the number of records allowing access and denying access to the content, but may multiply the count for similar records. As a result, a record for a similar user that contains a denial of access can effectively count more than a single denial for a less similar user.

Another implementation can perform an aggregation that more heavily weights and/or excludes records based on a degree of similarity between the second user 105 and other guardians. The degree of similarity can be determined by comparing past access decisions by other guardians to past decisions made by the second user 104. This aspect helps to take into account a particular parenting style of the second user 104 in presenting the second user 104 with a control decision profile. As a result, two children with identical characteristics can yield different content decision profiles for different guardians, based on the respective guardian's parenting style. For example, assume guardian A has denied access to content C1, C2, and C3, guardian B has denied access to C1, and C2 and allowed access to C3, and guardian C has allowed access to C1 and C2, while denying access to C3. With respect to guardian A, guardian B has a 66% similarity profile, while guardian C has a 33% similarity profile. As a result, when preparing a content profile for guardian A, the control records of guardian C may be given less weight (or excluded completely) as compared to control decision records made by guardian B. A threshold guardian similarity level may be used to determine which control decision records are excluded and/or weighted. For example, one implementation can require that past control decisions must be at least 50% similar to past decisions by the second user 105. Applying this threshold to the previous example, control decision records of guardian B would be included in the aggregation, while control decision records of guardian C would be excluded from the aggregation.

Similarly, the input of other guardians may be weighted based on a guardian reputation system in one embodiment. The reputation may be generated automatically in one embodiment by analyzing the degree of similarity between one guardian's choices and the choices of other guardians. In another embodiment, guardians are allowed to rate each others' selections, such that guardian ratings are based on actual rating values received from the guardians.

In yet another embodiment, the aggregation can take into account rating values stored in the control decision records. Instead of (or in addition to) merely storing whether a guardian allows or denies access to particular content, control decision records may include the guardian's rating for the particular content. Tracking content rating can help distinguish content that is clearly objectionable or allowable from content that is more neutral when creating the control decision profile. In one aspect, the rating can act as a multiplier when aggregating control decision records. For example, a very low rating may give more weight to a past denial whereas a very high rating may give more weight to a past acceptance. In another embodiment, the content profile may include an aggregated rating value representing an average (or weighted average) of the rating values across the aggregated control decision records.

In one embodiment, the control decision records are partially (or fully) aggregated prior to receiving a request for a content decision profile. For example, a routine process, run during a time when server 120 is at a low activity level (for example, late at night), may be used to aggregate results in anticipation of further access requests. Based on the first user's 102 attributes (such as age), the first user may be classifiable in one of a plurality of access level categories that range from relatively non-restrictive to relatively very restrictive. During the routine process, results may be aggregated and stored for each content identifier relative to each access level category. Through this method, when a first user 102 requests access to content associated with a content identifier for which aggregation has already been performed, less real-time processing power is needed by server 120.

In another embodiment, aggregation is performed over an on-going basis, as new guardian decisions are received. For example, a running count and/or rating may be kept for each content identifier and for each access level category.

In another embodiment, the aggregation occurs upon receiving the request from the first user 102 or second user 104. For example, a query, such as an SQL query, may run on database 130, returning an aggregated result for use in the content profile. Even when the control decisions are aggregated in advance, one implementation may allow the second user 104 to request a custom aggregation after being presented with the default content profile.

In yet another implementation, as shown in FIG. 1B, aggregation may be performed locally on the first device 103 by utilizing information stored locally, such as in database 138. In this implementation, the first device can download control decision records from server 120 and store them locally. Thereafter, the first device can periodically receive new control decision records from the server 120 for storage. In this implementation, the aggregation functionality discussed in reference to server 120 can instead be accomplished by the first device 103. This can decrease the amount of processing required by server 120, although it places extra storage demands on the first device 103.

Once the content profile is created, the content profile is then transmitted for eventual receipt by the second device 105. In one embodiment, the content profile includes the aforementioned aggregated data from control decision records. The server transmits the content profile to the second device 105, where the second user 104 is presented with a message requesting whether the first user 102 may access particular content. The message includes information from the content profile to aid the second user 104 in deciding whether to allow the first user 102 to access the content.

In another embodiment, the content profile transmitted from the server 120 may include the information from control decision records that is not fully aggregated, or and the first device 103 or second device 105 may complete the aggregation process. For example, the server 120 can send a plurality of control decision records to the first device 103, at least one record containing a decision from a guardian other than the second user 105. Parental control software running on first device 103 then completes the aggregation of the control decision records, and sends a message to second device 105, presenting the aggregated information to the second user 105.

In yet another embodiment, the server 120 makes an automatic determination of whether the first user 102 should be allowed to access the content, and sends a return message to the first device 103, denying or allowing access. The determination can be based on a first threshold against which information from the content profile is automatically compared. For example, a parent can set the first threshold so that if the aggregation of control decision records reveals an approval rate of less than 65%, access to the content will be automatically denied. In addition, one aspect allows the second user 104 to set the automatic threshold to apply when the second user 104 is unreachable. The second user 104 may be unreachable, for instance, when they are not online, when they are away from the computer, when their instant messaging status is set to "away," "busy," or some similar status, or when a predetermined amount of time passes without the second user 104 responding to the request for access to the content.

In one aspect, the determination of whether the second user 104 is available is made by the server 120 before the server transmits a content profile to the second device 105. If the second user 104 is not available, then the server 120 may automatically determine whether access should be granted, as described above. In one embodiment, access can only be granted by the second user 104, and not by an automatic process running on the server 120.

In an alternate embodiment, the first device 103 independently determines whether the second user 104 is available. For example, the parental control on the first device 103 may check the second user's 104 availability status, such as by checking the second user's messaging service (e.g., AOL Instant Messenger™). If the second user 104 is unavailable, the first device 103 sends a request for access to the server 120, and the server responds with an acceptance or denial. Otherwise, the first device 103 sends a request to the server 120 for a content profile. The content profile is created and then sent to the second user 104 by the server 120 or by the first device 103.

When the content profile is sent to the second user 104 (e.g., guardian), the second user receives a message identifying the first user and requesting access to the particular content. For example, the message could be an instant message sent from the first user 102 (or, alternatively, sent from server 120). The message could also be an email, or if the second device is a mobile communications device, such as a cell phone, the message can be a text message. In one embodiment, the message comprises a telephone message to the second user 104.

The message generally states that the first user 102 seeks permission to access particular content, and presents information identifying the content, such as the content identifier. The message may also include a link to the content in one implementation. This allows the second user 105 to preview the content, if desired, by accessing the content over an Internet connection. In another aspect, the first user 102 may provide comments in the message, for example, explaining why they want to access the content.

In addition, information from the content profile is displayed (and/or audibly presented) in the message. As previously explained, the message may tell the user that only 32% of children of that grade level in that city were allowed to access the content. The message may also display a percentage of guardians who have disallowed access to the content after previously allowing access and/or who have allowed access after previously disallowing access. In one embodiment, the second user 104 may then accept or reject the content by clicking corresponding response buttons on the instant message. In another embodiment, such as when responding to a text message, the second user 104 may respond by sending a "yes" or "no" answer back to the sender. In addition, one embodiment allows the second user 104 to send comments back to the first user 102, such as reasons for not allowing access or requesting an explanation from the first user 102 before access is granted. In an embodiment where the second device 105 is contacted via a telephone call, the second user 104 may respond by pressing a button on the second device 105.

In another implementation, the second user 104 can submit a rating indicating the appropriateness (or inappropriateness) of the particular content. The rating can be in addition to choosing whether or not to allow or deny access, or the rating itself may determine whether access should be granted, consistent with another embodiment.

After the second user 104 submits the rating and/or decision on whether to allow or deny access to the content, the decision is eventually received by server 120. In some embodiments, the decision is immediately sent to server 120. In other embodiments, the decision is immediately sent to the first device 103, but is stored for later upload to the server 120, such as in a batch process.

For example, FIG. 2 illustrates several guardians 202 uploading information to server 120, for creation of new control decision records that are stored in database 130, in accordance with an embodiment. As is shown in FIG. 2, second user 104 is just one of many guardians 202 whose control decisions are sent from their respective devices 241, 243, 245, and 247 to sever 120 over a network 150, such as the Internet. Because of the many guardians 202 submitting control decisions, and the many first users (e.g., child users) 102 that request permission to view particular content, a separate server cluster may be used to receive control decisions from guardians than the server that receives requests from first users in one embodiment.

In addition, the guardian devices (e.g., second device 105) and/or child devices (e.g., first device 103) may batch control decisions for later submittal to server 120. For example, after receiving a guardian decision allowing or denying access to content, first device 103 may store the guardian decision in a local memory until a specified number of guardian decisions have been received. At that time, the parental control software on the first device 103 may contact server 120 and upload all of the locally stored guardian decisions to server 120. In an alternate embodiment, the decisions are stored on the guardian devices until a later time when they are uploaded in mass to server 120.

When the server 120 receives a guardian decision, the server 120 may create a control decision record that is stored in database 130. The exact data stored as part of a control decision record can vary between the embodiments.

Figure 5:
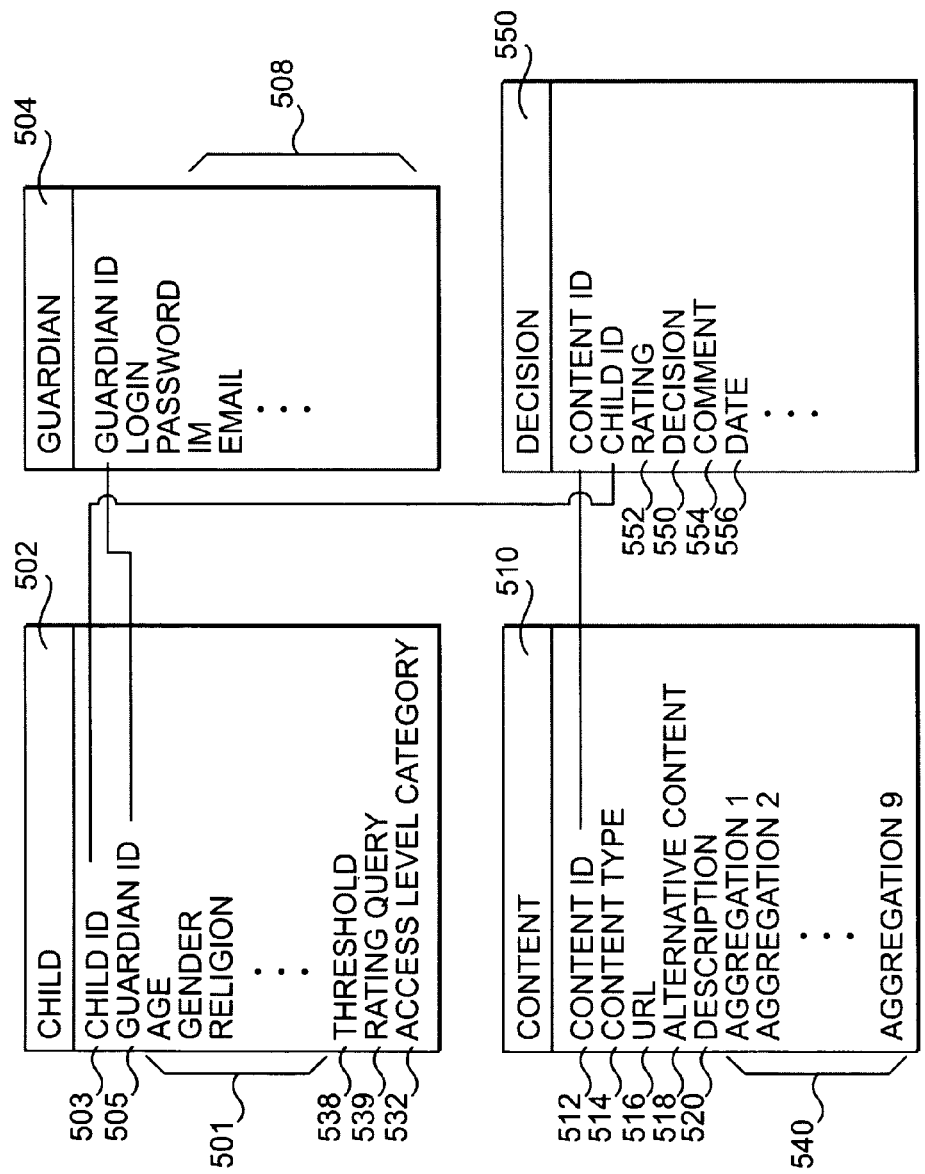
FIG. 5 is a diagram of exemplary database structures that may be used for storing and retrieving control decision records used in creating a content profile, in accordance with some embodiments.

FIG. 5 is a diagram of exemplary database structures used for storing and retrieving control decision records in database 130, in accordance with some embodiments. Turning to FIG. 5, several exemplary tables 502, 504, 510, and 550 are shown. These exemplary tables are used to store information about child users (table 502), guardians (table 504), content (table 510), and decisions relating to that content (table 550). As is illustrated, the information necessary for a single control decision record may be spread across a plurality of tables or even a plurality of databases.

In the example of FIG. 5, a child (e.g., first user 102) is relationally associated with a guardian (e.g., second user 104) via a guardian identifier 505. If the server 120 is responsible for transmitting messages to the guardian, information 508 may be stored to aid the server 120 in locating the guardian. For example, the guardian's instant messaging contact info and/or e-mail address can be stored.

Likewise, by storing a child identifier 503 with the control decision record, such as in decision table 550, each control decision record can be associated with a child and, therefore, also with a guardian. By associating the record with a child, the server can also compare child attributes 501 among the various control decision records. Likewise, a history of decisions for a first guardian can be compared against a history of decisions for a second guardian to determine whether the guardians make similar decisions.

Threshold information 538 may be stored with the child and/or guardian to determine threshold levels for automatic responses by the server 120 to content access requests. Similarly, one or more particular queries 539 for determining a specific content profile for the child may be stored with the child information. Through this approach, a guardian can customize particular aggregation criteria for use in creating the content profile for their child.

Information about the particular content can be stored in the content table 510. For example, the content may be categorized by type 514, such as identifying the content as a Web site, image, document, program file, etc. A URL 516 associated with the content may be stored for presentation to the guardian and/or for associating the content requested with a content identifier 512. Suggested alternate content 518, such as an associated Web page, may also be stored. A general description 520 of the content can also be stored, and used to describe the content to a guardian, such as the second user 104.

In one embodiment, prior aggregation information 540 is stored in association with the content. The pre-run aggregation information 540 may include the results for various access level categories, such as the one or more categories illustrated in FIG. 5. In that embodiment, a child's access level category 532 can direct which pre-run aggregation information applies to that particular child, and this information can be used to create the content profile and/or automatically allow or deny access to the content by comparing the information 540 to a threshold 538. The server 120 may periodically determine the child's access level category by comparing past decisions of the child's guardian to past decisions made by other guardians, and ranking the child accordingly.

The decision table 550 in this example is used to store guardian decisions 550 and/or ratings 552. This information is associated with a content identifier 512, so that the server 120 can analyze decisions for particular content. The guardian decision 550 indicates whether access was allowed, and is stored concurrently with a date 556. The date value allows the server 120 to exclude out-dated decisions from the aggregation, to better take into account changes that may occur to content such as web sites. The rating value 552 can be a numeric value, such as between 1 and 10, that can act as a multiplier during aggregation.

In addition, an embodiment may allow the guardian to submit comments 554 regarding their decision 550 (or rating 552). A future guardian, such as the second user 104, may be able to view these comments. For example, comments made by the guardian most similar to the second user 104 may be presented to the second user 104 as part of the content profile. In one embodiment, the guardian may submit alternate content so that other guardians may provide their respective users with other content to view or use instead of the objectionable content. This could allow, for example, a parent to direct their child to a safer website or application.

The table schema presented in FIG. 5 is only exemplary. Many different schemas are possible for storing control decision records. In particular, while FIG. 5 provides an example for a child as the first user, other table schemas may be implemented for other types of first users, such as students, employees, etc. Moreover, the various identifiers may be associated with one another differently depending on the schema. For example, while the child identifier 503 and guardian identifier 505 co-exist in table 502 in FIG. 5, the child identifier 503 and guardian identifier 505 may require a multi-table approach to establish the relationship under another schema. In either case, the identifiers are considered associated for the purposes of this disclosure.

Figure 3:
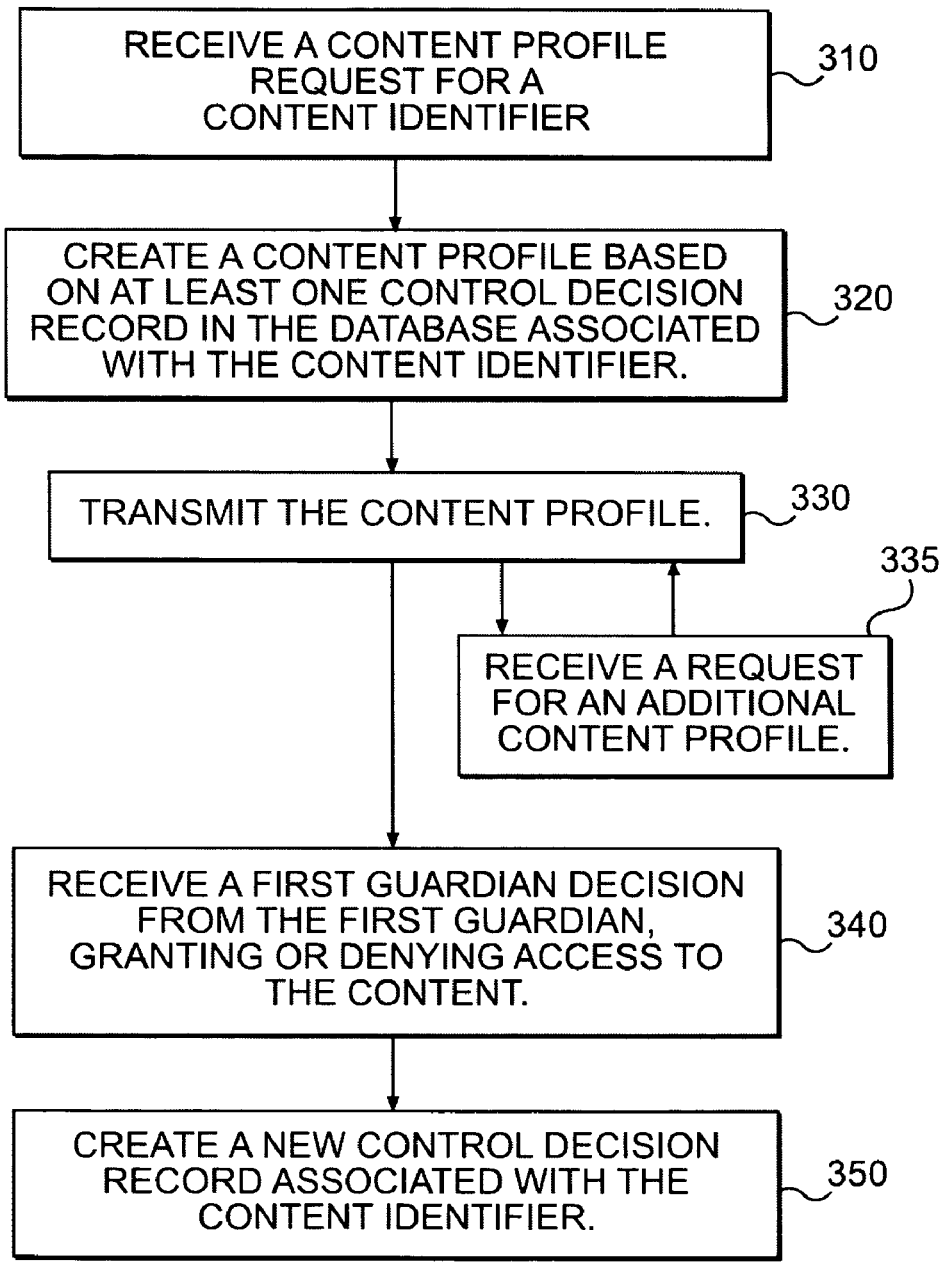
FIGS. 3, 4A, 4B, and 4C are exemplary flow charts that include steps taken to restrict content access by a user based on guardian control decisions, in accordance with some embodiments.

FIGS. 3, 4A, 4B, and 4C present exemplary flow charts that include steps taken to restrict content access by a user based on guardian control decisions, in accordance with some embodiments. In particular, FIG. 3 illustrates an exemplary process that involves receiving a guardian decision, while FIG. 4 illustrates an exemplary process for automatically determining whether a child should have access to the content.

Turning to FIG. 3, a server 120 receives a content profile request based on an identifier of the first user 102 (e.g., a child identifier) and a content identifier at step 310. The content profile request could be part of a new access request by a first user 102, or it could be a separate content profile request by either the first user 102, second user 104, or software running on a device used by either user.

At step 320, the server creates a content profile based on at least one control decision record in the database associated with the content identifier. In one implementation, the control decision record contains a second access decision made by a second guardian. Through this method, the control profile accounts for decisions by other guardians. In an embodiment such as in FIG. 1B, where records are stored locally in database 138, the control profile may include non-aggregated records. In other embodiments, the records may be aggregated.

At step 330, the content profile is transmitted for eventual consumption by the second user 104. In one embodiment, the content profile is transmitted directly to the second device 105. In other embodiments, the content profile is first transmitted to the first device 103, or an intermediate device, such as an e-mail server.

According to one embodiment, it is possible to allow the guardian to request an additional content profile, which is received by the server 120 at step 335. This request may contain specific criteria for creating the profile.

At one point, the server receives a first guardian decision from the first guardian, granting or denying access to the content, at step 340. The decision may be uploaded with other locally stored decisions at some later time, or the decision may be transmitted by the first device 103 upon receipt or transmitted by the second device 105 when the decision is made.

At step 350, after the server receives the decision, the server 120 creates a new control decision record associated with the content identifier. The new control decision record may include the first guardian decision and be stored in the database 130. The control decision record can then be used in creating future content profiles.

Figure 4A:
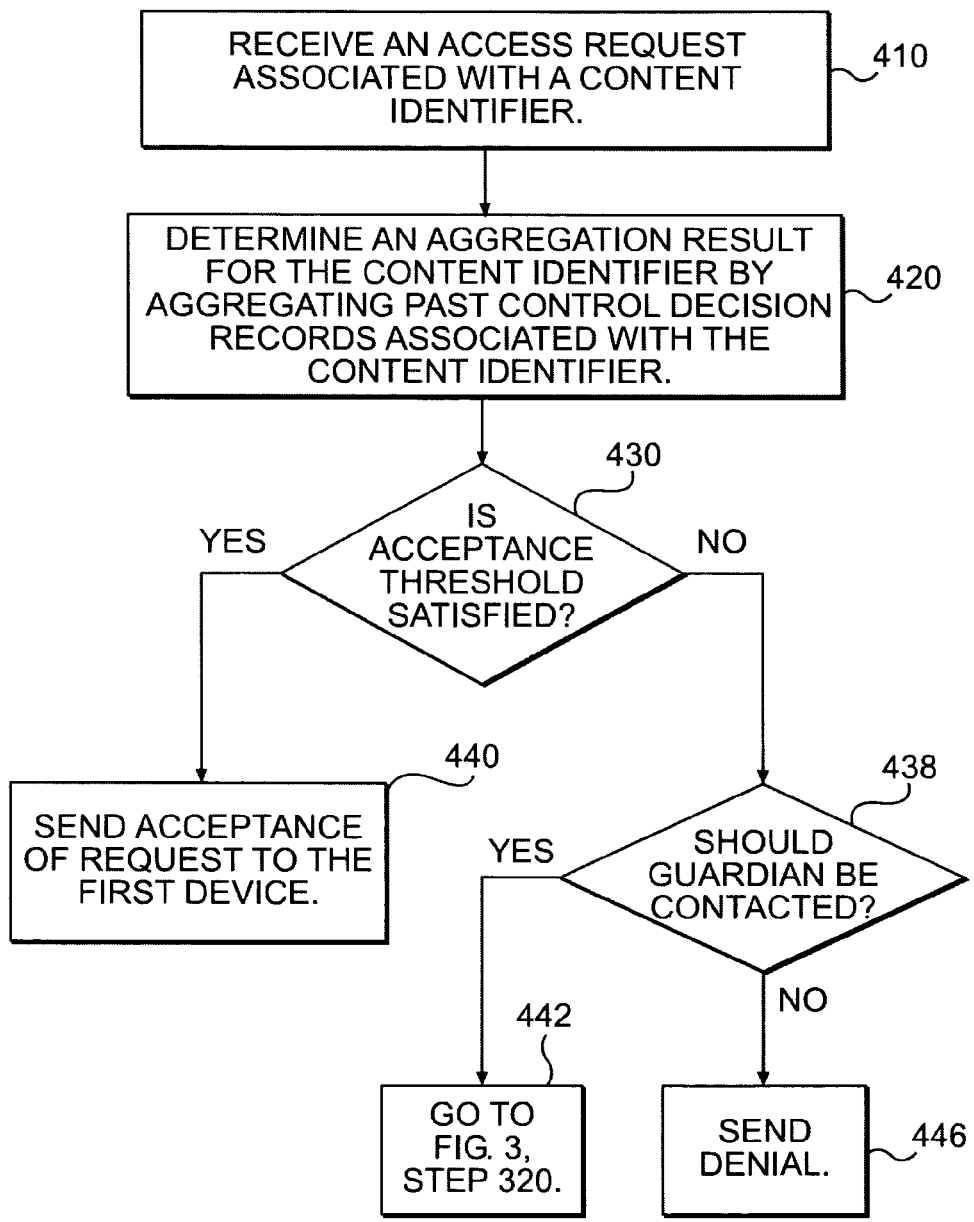
Figure 4B:
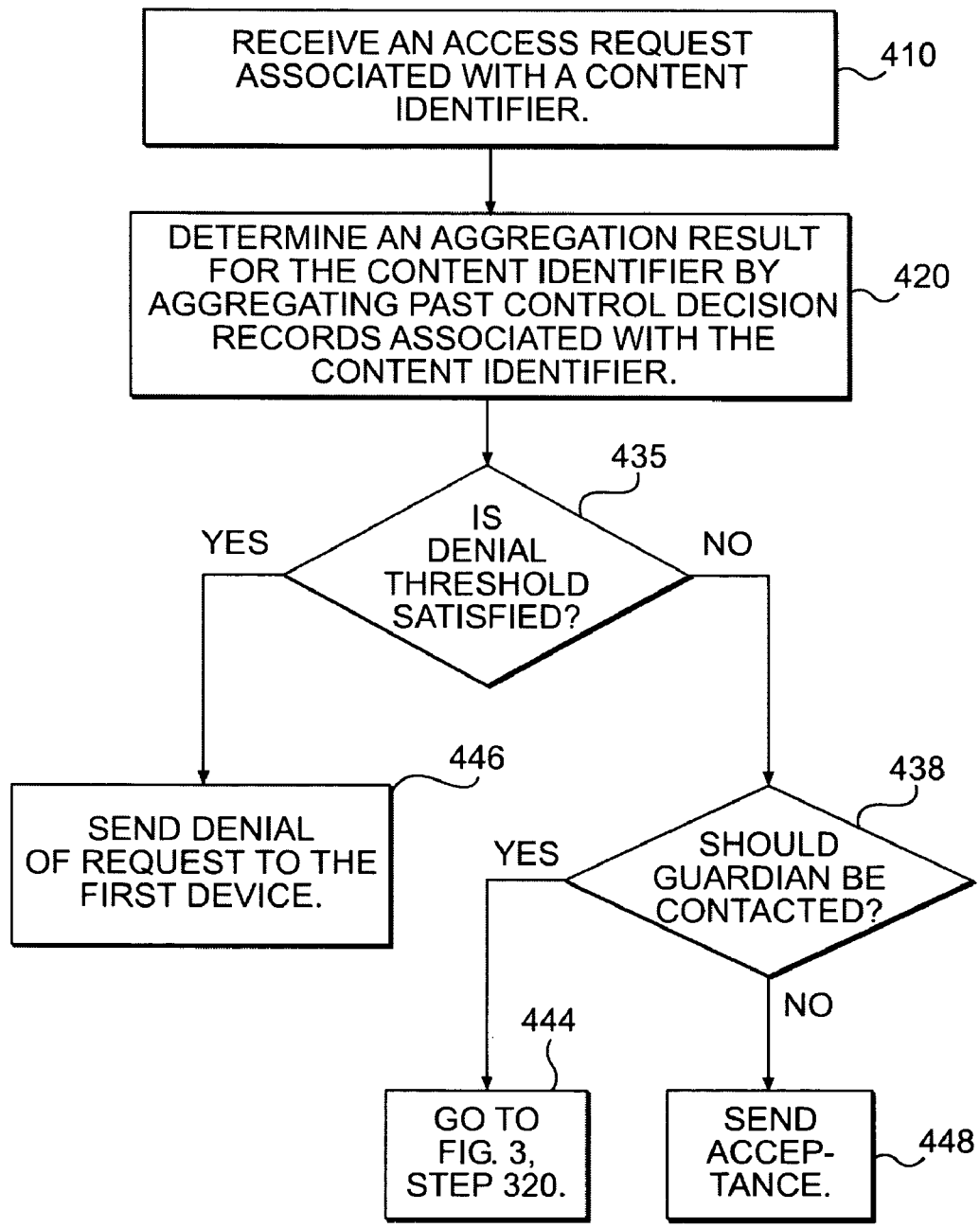
Figure 4C:
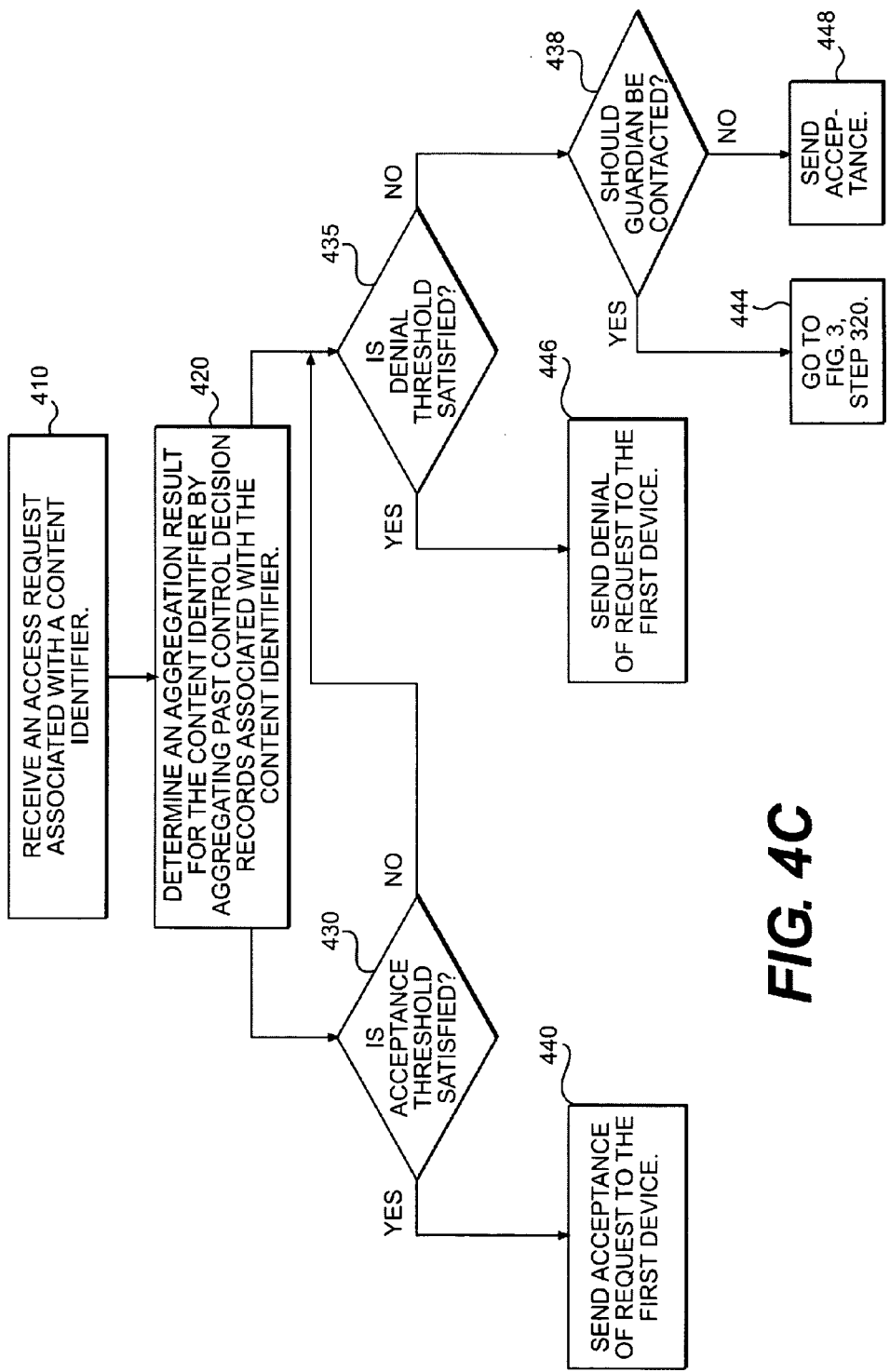

Turning now to the exemplary processes of FIGS. 4A, 4B, and 4C, three embodiments that utilize threshold(s) for making automatic access decisions are presented. In all three examples, an access request is received at step 410. The server then determines an aggregation result at step 420 to compare against a threshold associated with the first user 102 and/or second user 104. For example, the aggregation result may be that 55% of guardians allow their child to view the particular content. Although FIGS. 4A, 4B, and 4C depict step 420 as occurring after step 410, the aggregation of past control decision records associated with the content identifier may occur prior to receiving an access request in one embodiment.

In FIG. 4A, the embodiment utilizes a threshold that allows the system to automatically allow the first user to access particular content. The aggregation result is compared against the threshold at step 430 to determine whether the threshold is satisfied. If the threshold is satisfied, then an automatic acceptance of the request is sent to the first device at step 440, allowing the first user to access the content.

If the threshold is not satisfied at step 430, the server checks to see if a guardian should be contacted at step 438. For example, this may involve checking the guardian's online status, or checking a preference setting supplied by the guardian. If the guardian should not be contacted, then, at step 446, an automatic denial is sent to the first user.

However, if the guardian should be contacted, then the server follows the logic of FIG. 3, beginning at step 320, in one embodiment. Under that scenario, even though the automatic acceptance threshold fails, the guardian is still given the option to allow the first user to access the content.

Turning to FIG. 4B, an exemplary process utilizing an automatic denial threshold is explained. At step 435, the server checks the aggregation result against the denial threshold. If the threshold is satisfied, then an automatic denial of the request is sent to the first device at step 446, restricting the first user from accessing the content.

However, if the threshold is not satisfied at step 435, the server checks to see if a guardian should be contacted at step 438. If the guardian should not be contacted, then, at step 448, an automatic acceptance is sent to the first user. Conversely, if the guardian should be contacted, then the process follows the steps of FIG. 3, beginning at step 320.

Finally, turning to FIG. 4C, an exemplary process that utilizes both an acceptance threshold and a denial threshold is explained. In this example, the acceptance threshold is first checked at step 430. (Another embodiment may first check the denial threshold at 435 before checking the acceptance threshold.) If the acceptance threshold is satisfied, then an acceptance is sent to the first device at 440, and the process is complete.

If, instead, the acceptance threshold is not met, then the denial threshold is checked at 435. An automatic denial is sent to the first device at step 446 if the denial threshold is met. Otherwise, the server then checks to see whether the guardian should be contacted at step 438. If not, then an automatic acceptance or denial is sent to the first user at step 450, depending upon a default setting or a setting supplied by the guardian. In one instance, the automatic default choice is selected by comparing default values for similar first users and/or guardians, as described in greater detail in other parts of this disclosure.

Lastly, if the guardian should be contacted, then the process continues at FIG. 3, step 320.

It should be noted that the exemplary processes of FIGS. 4A, 4B, and 4C, can take place on the first device 103 in one embodiment. The steps remain the same, except the first device 103 contains the threshold information locally, and can automatically make some or all of the necessary decisions without contacting server 120.

Other embodiments of the invention will be apparent to those skilled in the art from consideration of the specification and practice of the embodiments and aspects of the invention disclosed herein. It is intended that the specification and examples be considered as exemplary only, with a true scope and spirit of the invention being indicated by the following claims.

What is claimed is:

1. A system for remotely controlling access to electronic content, wherein a first user uses an electronic device and a first guardian uses a guardian device, the system comprising:
    a database for storing a first plurality of control decision records associated with a plurality of guardians; and
    a server in communication with the database comprising:
        receive a content profile request based on a first user identifier and a content identifier, wherein the content identifier is associated with the electronic content and the first user identifier is associated with the first user;
        create a content profile for the first user identifier and content identifier, the content profile including information indicating a percentage of guardians that have allowed access to the electronic content, wherein the content profile is based on at least one control decision record in the database associated with the content identifier, the control decision record containing a second guardian decision made by a second guardian with respect to a second user, wherein the second guardian decision is a past decision granting or denying the second user access to the electronic content, wherein the content profile is based on aggregating a second plurality of control decision records associated with guardians that have made similar past decisions when compared to the first guardian, a degree of similarity influencing which of the first plurality of control decision records are included in the second plurality of control decision records;
        transmit the content profile;
        receive a first guardian decision from the first guardian, granting or denying the first user access to the electronic content; and
        create a new control decision record associated with the content identifier, the new control decision record including the first guardian decision and being stored in the database.

2. The system of claim 1, wherein the server is further operable to send the first guardian decision to the electronic device of the first user, granting access to the electronic content when the first guardian decision indicates allowance and denying access to the electronic content when the first guardian decision is a denial.

3. The system of claim 1, wherein the content profile is based on aggregating a plurality of control decision records associated with other users sharing at least one similarity with the first user associated with the first user identifier, the similarity being based on age, gender, nationality, religion, educational grouping, or locality.

4. The system of claim 1, wherein the content profile indicates a sequence of control decisions with respect to the content identifier, the sequence of control decisions being made by at least a second guardian within the plurality of guardians.

5. The system of claim 1, wherein the server is further operable to receive a request for a second content profile from the first guardian, the second content profile being based on criteria specified by the first guardian.

6. The system of claim 1, wherein the first guardian decision includes a rating of the content associated with the content identifier, wherein the rating is stored as part of the new control decision record.

7. A non-transitory computer-readable storage medium containing instructions that, when executed by a processor, cause the processor to perform the stages of:
    receiving a request for a content profile, the request including a content identifier and a first user identifier, wherein the content identifier is associated with the electronic content and the first user identifier is associated with a first user;
    creating a content profile for the first user identifier and content identifier, the content profile including information indicating a percentage of guardians that have allowed access to the electronic content, wherein the content profile is based on at least one control decision record in a database, the control decision record being associated with the content identifier and containing a second guardian decision made by a second guardian with respect to a second user, wherein the second guardian decision granted or denied the second user access to the electronic content in the past, wherein the content profile is based on aggregating a plurality of control decision records associated with guardians that have made past decisions similarly to the first guardian, the degree of similarity influencing which control decision records are included in the plurality of control decision records;
    sending a first communication containing the content profile to a first guardian;
    receiving a first guardian decision from the first guardian, granting or denying access to content associated with the content identifier;
    creating a new control decision record associated with the content identifier, the new control decision record including the first guardian decision; and
    storing the record on a storage medium.

8. The computer-readable storage medium of claim 7, wherein the stages further include:
    sending an access communication to an electronic device of the first user;
    granting access to the electronic content when the first guardian decision is an allowance; and
    denying access to the electronic content when the first guardian decision is a denial.

9. The computer-readable storage medium of claim 7, wherein the content profile is based on aggregating a plurality of control decision records associated with other users similar to the first user associated with the first user identifier, the similarity being based on age, gender, nationality, religion, education grouping, or locality.

10. A system for controlling access to electronic content by a first user of an electronic device, the system comprising:
a database for storing a first plurality of control decision records based on decisions received from a plurality of guardians; and
a server in communication with the database comprising:
receive an access request associated with a content identifier, wherein the access request is for the first user;
determine an aggregation result for the content identifier by aggregating past control decision records associated with the content identifier, the aggregation result including information indicating a percentage of guardians that have allowed access to the electronic content, wherein at least one of the aggregated control decision records contains a decision made by a second guardian with respect to a second user, wherein the second guardian decision is a past decision granting or denying the second user access to the electronic content, wherein the aggregation result is based on aggregating a plurality of control decision records associated with guardians that have made past decisions similarly to the first guardian, the degree of similarity influencing which control decision records are included in the plurality of control decision records; and
automatically send a first communication based on the aggregation result to the electronic device for utilization in granting or denying the first user access to the electronic content.

11. The system of claim 10, the server further operable to:
determine a threshold used for automatically choosing whether the first user should be granted access to the electronic content; and
compare the aggregation result against the threshold to determine whether access should be automatically granted or denied.

12. The system of claim 11, wherein each control decision includes a content rating.

13. The system of claim 11, wherein the server is further operable to:
receive a communication from the first guardian, the communication containing criteria that is used in determining the threshold.

14. The system of claim 11, wherein the server is further operable to automatically select the threshold based on the threshold of a plurality of guardians that have made past control decisions similarly to the first guardian.

15. The system of claim 11, wherein when the threshold is not met, the server is further operable to:
create a content profile based on at least one control decision record in the database associated with the content identifier, the control decision record containing the decision of a second guardian;
send a first communication containing the content profile to the first guardian;
receive a first guardian decision from the first guardian, granting or denying access to the content; and
create a new control decision record associated with the content identifier, the new control decision record containing the first guardian decision and being stored in the database.

16. A method for storing control decision records in a database for later aggregation in determining whether to allow a first user to access electronic content, the method including stages comprising:
receiving a guardian decision from a first guardian with respect to a content identifier, the content identifier being associated with the electronic content, wherein the guardian decision grants or denies the first user access with respect to the content identifier; and
storing a new control decision record in a database, the new control decision record containing the guardian decision, a content identifier, and a person identifier, the person identifier being associated with the first user;
wherein the new control decision record is stored in a manner that allows the new control decision record to be accessed based on the content identifier, and the guardian decision to be aggregated with a plurality of other guardian decisions made by other guardians for users other than the first user, in order to generate a content profile that includes information indicating a percentage of guardians that have allowed access to the electronic content, wherein the content profile is based on aggregating a plurality of control decision records associated with guardians that have made past decisions similarly to the first guardian, the degree of similarity influencing which control decision records are included in the plurality of control decision records.

17. The method of claim 16, the stages further comprising:
storing a user attribute in the database, the user attribute being associated with the first user and being one of age, gender, nationality, religion, educational grouping, or locality.

18. The method of claim 17, wherein a threshold level from a plurality of threshold levels is assigned to the first user based at least partially on threshold level values for other users that share the user attribute with the first user.

19. The method of claim 16, wherein a threshold level from a plurality of threshold levels is assigned to the first user based at least partially on past decisions made by the first guardian relative to decisions on similar content made by other guardians; and
wherein past decisions by the first guardian allowing the first user access to the similar content at a relatively higher frequency than the other guardians, cause the threshold level assigned to the first user to be relatively less restrictive.

20. The method of claim 19, wherein the first threshold level is calculated as part of a process that runs independently of receiving contact from the first user or first guardian.

* * * * *

UNITED STATES PATENT AND TRADEMARK OFFICE
CERTIFICATE OF CORRECTION

| | | |
|---|---|---|
| PATENT NO. | : 8,346,953 B1 | Page 1 of 1 |
| APPLICATION NO. | : 12/000843 | |
| DATED | : January 1, 2013 | |
| INVENTOR(S) | : Chin Hew and Thu Rein Kyaw | |

It is certified that error appears in the above-identified patent and that said Letters Patent is hereby corrected as shown below:

Claim 8, col. 14, line 64, "decision a denial" should read -- decision is a denial --.

Signed and Sealed this
Second Day of April, 2013

Teresa Stanek Rea
*Acting Director of the United States Patent and Trademark Office*